United States Patent [19]

Smith-Williams

[11] Patent Number: 4,634,325

[45] Date of Patent: Jan. 6, 1987

[54] EYE LOOP TIE DOWN BRACKET

[76] Inventor: Margie M. Smith-Williams, 7929 Stewart & Gray #10, Downey, Calif. 90241

[21] Appl. No.: 342,641

[22] Filed: Jan. 25, 1982

Related U.S. Application Data

[63] Continuation-in-part of Ser. No. 224,027, Jan. 12, 1981, abandoned.

[51] Int. Cl.[4] .............................................. B61D 45/00
[52] U.S. Cl. ....................................... 410/101; 410/106
[58] Field of Search ............... 410/101, 106, 108, 109, 410/110, 112, 113, 114, 115, 116; 24/68 CD, 261 C, 265 CD

[56] References Cited

U.S. PATENT DOCUMENTS

| | | | |
|---|---|---|---|
| 499,549 | 6/1893 | Hunter et al. | 24/261 C X |
| 2,599,873 | 6/1952 | Smith | 410/110 |
| 2,709,972 | 6/1955 | Ingran | 410/106 |
| 2,853,959 | 9/1958 | Goodwin | 410/110 |
| 3,674,172 | 3/1972 | Van Der Molen | 24/265 CD X |
| 3,774,364 | 11/1973 | Johnson | 410/101 X |

OTHER PUBLICATIONS

Society of Automotive Engineers, Inc., SAE Handbook, p. 669 (1970).

Primary Examiner—David A. Scherbel
Attorney, Agent, or Firm—Keith D. Beecher

[57] ABSTRACT

A tie down bracket is provided which is formed of a looped rod-like member, and which may be conveniently welded or bolted to trailers, or other vehicles or structures. The configuration of the bracket is such that it can conveniently be welded or bolted to the frame of the vehicle by two separate welds, or two separate pairs of bolts, disposed at 90° to one another for enhancing the tie down strength.

5 Claims, 5 Drawing Figures

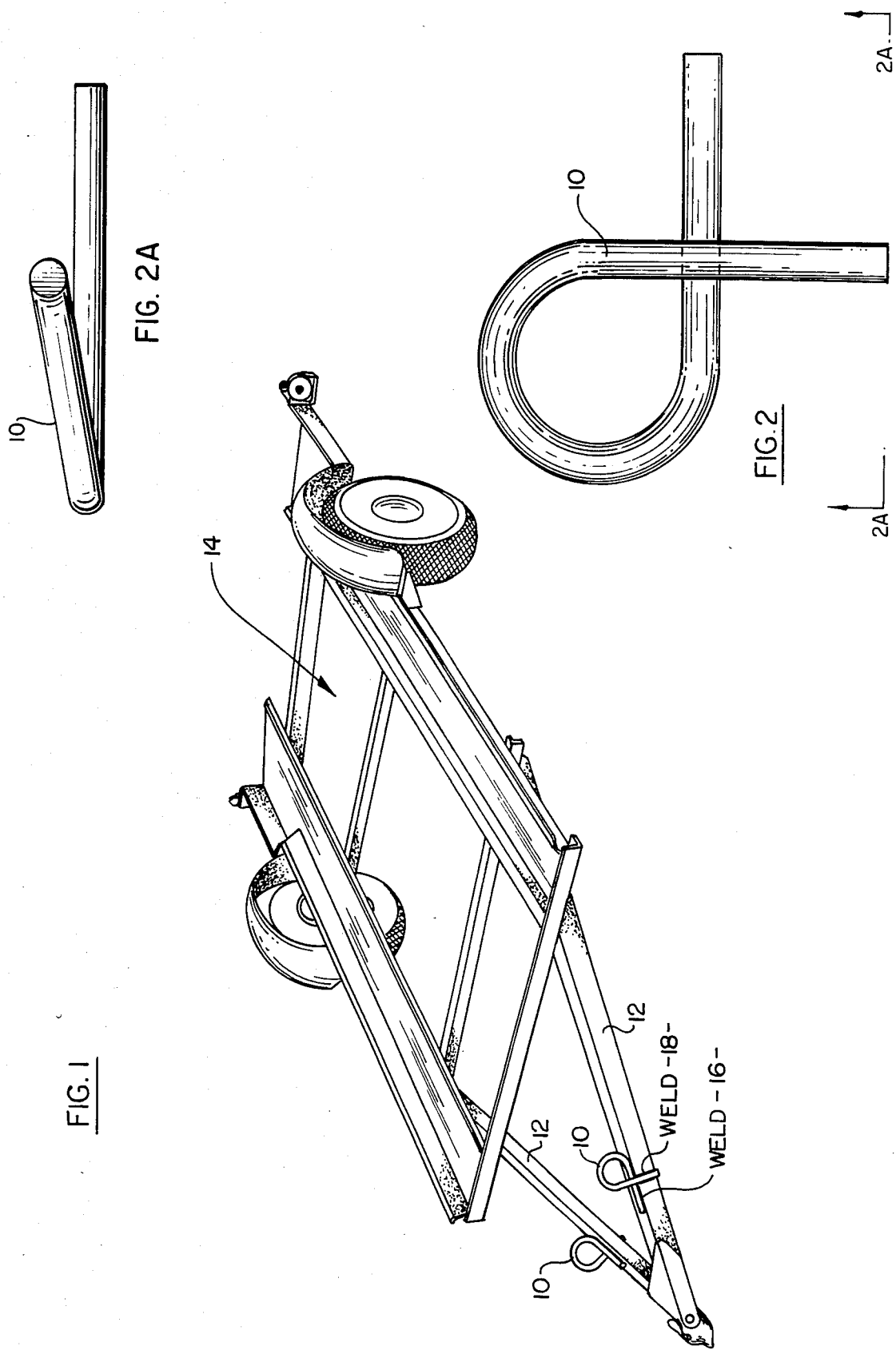

EYE LOOP TIE DOWN BRACKET

This application is a continuation-in-part of Copending application Ser. No. 224,027 filed Jan. 12, 1981 (now abandoned).

BACKGROUND

The objective of the present invention is to provide a one-piece tie down bracket that is extremely simple and inexpensive to construct, and one which may be securely mounted to the frame of the vehicle by simple welding or bolting operations to provide two welds, or two pairs of bolts, at right angles to one another.

As will be described, the bracket of the invention is formed of a rod-like member composed, for example, of steel or other appropriate material, and which is looped into an eye configuration. The bracket has two essentially straight end portions which traverse one another at essentially 90°, both of which provide a mounting means for the bracket by forming mutually perpendicular welds, or pairs of bolts, between the end portions and the supporting structure.

BRIEF DESCRIPTION OF THE DRAWINGS

FIG. 1 shows a pair of brackets each constructed in accordance with one embodiment of the invention mounted, for example, on the tongue of the trailer;

FIG. 2 is a plan view of either one of the brackets of FIG. 1;

FIG. 2A is an end elevational view of the bracket of FIG. 2 taken along the lines 2A—2A of FIG. 2;

DETAILED DESCRIPTION OF THE ILLUSTRATED EMBODIMENTS

Figure 3:
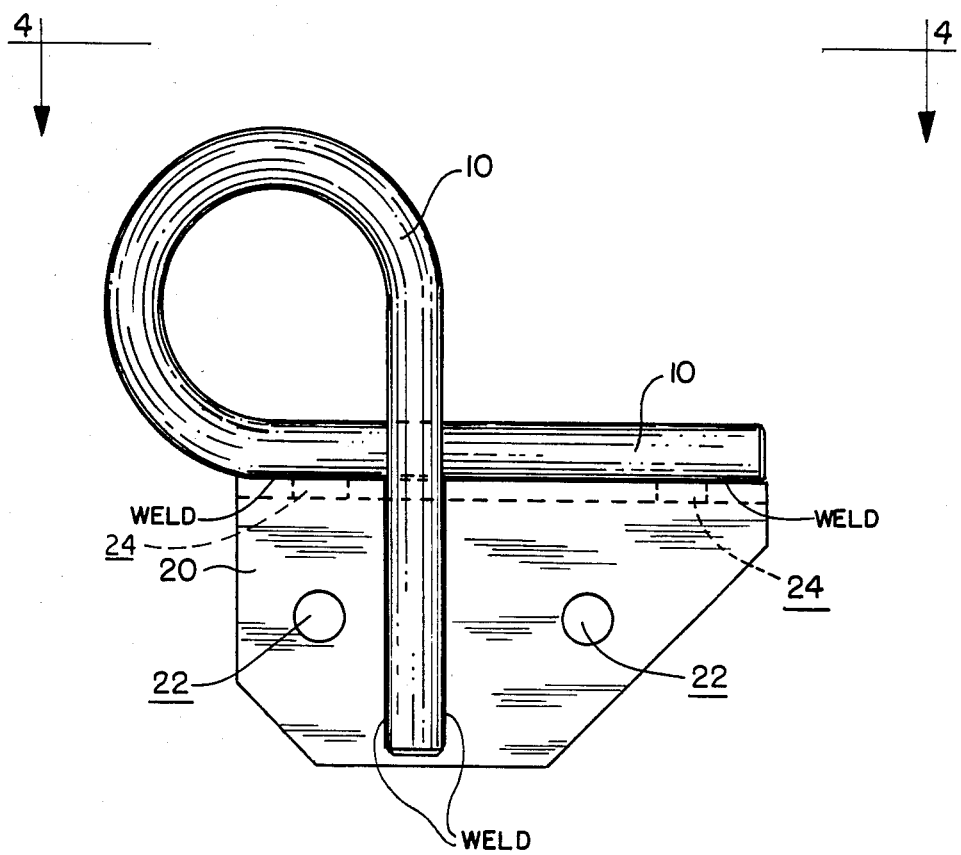
FIG. 3 shows a plan view of a bracket constructed in accordance with a second embodiment of the invention.

As shown in FIGS. 1, 2 and 2a, the eye loop bracket of the invention is designated 10, and it has a central looped portion forming the eye, and two essentially straight end portions which cross one another at right angles.

As shown in FIG. 1, two brackets 10 are mounted on the tongue 12 of a trailer 14. The brackets are mounted on the tongue, for example, by forming a weld 16 along one of the end portions, and by forming another weld 18 along the other end portion at right angles to weld 16, so as to secure the bracket firmly to the tongue, or other part of the frame of the trailer.

Figure 4:
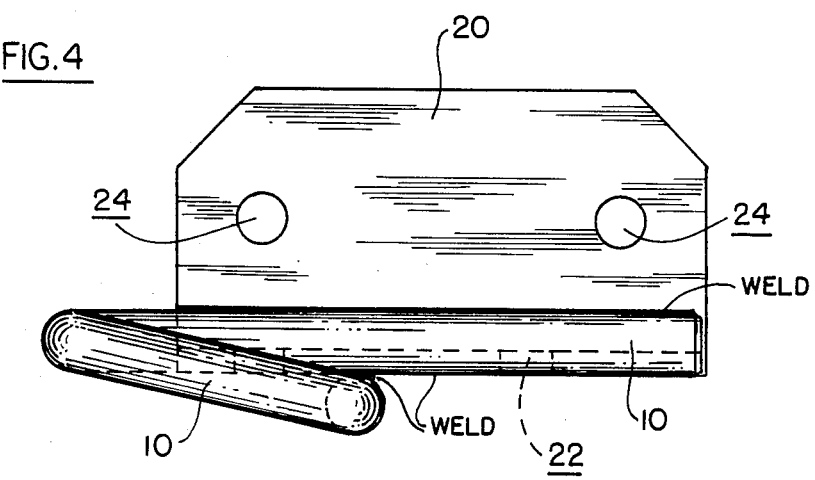
FIG. 4 is a side elevational view of the bracket of FIG. 3, taken along the lines 4—4.

In the embodiment of FIGS. 3 and 4, a plate 20 is welded to the bracket 10, the plate 20 having two portions disposed at right angles to one another. Each portion of the plate 20 has two holes 22, 24 which permit the plate and bracket to be bolted to the frame of trailer 14.

Since the bolts extend in two mutually perpendicular directions, all tension loads on the bracket 10 produce shear stresses in the bolts so that the bolts are capable of withstanding such tension loads of high order.

It will be appreciated that although particular embodiments of the eye loop bracket of the invention have been shown and described, modifications may be made, and it is intended in the claims to cover all modifications which come within the true spirit and scope of the invention.

What is claimed is:

1. An eye bracket formed of a rod-like member bent into a loop and having end portions each extending a predetermined distance beyond the loop and being disposed at a predetermined angle to one another, said eye bracket including an apertured plate secured thereto along one of said end portions and traversing the other of said end portions for permitting the bracket to be bolted to a supporting frame.

2. The eye bracket defined in claim 1, in which said plate has two portions disposed at right angles to one another, each of said portions having at least one aperture therein.

3. In combination: a vehicle having a frame, and an eye bracket mounted on said frame, said eye bracket being formed of a rod-like member bent into a loop and having end portions each extending a predetermined distance beyond the loop and being disposed at a predetermined angle to one another, and with first and second welds respectively extending along the end portions and securing the bracket to the frame.

4. The combination defined in claim 3, in which said end portions and said welds are essentially straight.

5. The combination defined in claim 4, in which said end portions and said welds are essentially at right angles to one another.

* * * * *